(12) United States Patent
Kang

(10) Patent No.: US 6,904,343 B2
(45) Date of Patent: Jun. 7, 2005

(54) METHOD OF CONTROLLING AUTOMATIC GUIDED VEHICLE SYSTEM

(75) Inventor: Yeon-Il Kang, Yongin (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/281,962

(22) Filed: Oct. 29, 2002

(65) Prior Publication Data

US 2004/0006415 A1 Jan. 8, 2004

(30) Foreign Application Priority Data

Jul. 4, 2002 (KR) .............................. 10-2002-0038751

(51) Int. Cl.[7] .......................... G05D 11/00; G06F 19/00
(52) U.S. Cl. .................... 701/23; 318/568.12; 340/435; 700/245; 342/457
(58) Field of Search .............................. 701/23, 24, 69, 701/210; 318/568.12, 587, 580, 652, 618; 180/167, 169, 168; 340/435, 989, 988, 992, 460; 700/245, 169, 9; 342/70; 320/107

(56) References Cited

U.S. PATENT DOCUMENTS

| | | | | |
|---|---|---|---|---|
| 4,593,238 A | * | 6/1986 | Yamamoto .................. | 318/587 |
| 4,780,817 A | * | 10/1988 | Lofgren ..................... | 180/168 |
| 5,002,145 A | * | 3/1991 | Wakaumi et al. .......... | 180/168 |
| 5,091,855 A | * | 2/1992 | Umehara et al. .......... | 180/168 |
| 5,303,154 A | * | 4/1994 | Luke, Jr. ..................... | 340/460 |
| 5,764,014 A | * | 6/1998 | Jakeway et al. ........... | 318/587 |
| 5,812,267 A | * | 9/1998 | Everett et al. .............. | 356/614 |
| 5,961,559 A | * | 10/1999 | Shimbara et al. .......... | 701/23 |
| 6,038,501 A | * | 3/2000 | Kawakami .................. | 701/23 |
| 6,092,010 A | * | 7/2000 | Alofs et al. ................. | 701/23 |
| 6,246,930 B1 | | 6/2001 | Hori ............................. | 701/23 |
| 6,345,217 B1 | * | 2/2002 | Zeitler et al. ............... | 701/23 |
| 6,445,984 B1 | * | 9/2002 | Kellogg ....................... | 701/23 |
| 6,654,647 B1 | * | 11/2003 | Kal ............................... | 700/9 |
| 2002/0007235 A1 | * | 1/2002 | Hwang et al. ............... | 701/23 |
| 2004/0122570 A1 | * | 6/2004 | Sonoyama et al. ......... | 701/23 |

OTHER PUBLICATIONS

"A Real Time Traffic Control Scheme for a Multiple AGV System", Jeong–Hoon Lee et al., pp. 1625–1630, IEEE, 1995.*

"Task Scheduling for Flexible Manufacturing Systems On Genetic Algorithms", Edwin S.H. Hou, pp. 397–402 vol. 1, IEEE, 1991.*

* cited by examiner

Primary Examiner—Thomas G. Black
Assistant Examiner—Tuan C To
(74) Attorney, Agent, or Firm—Staas & Halsey LLP (57) ABSTRACT

A method of controlling an Automatic Guided Vehicle (AGV) system having a plurality of AGVs includes setting a moving path with task times of all the AGVs taken into account, and controlling the AGVs according to the set moving path. The setting the moving path includes calculating respective costs required for the AGVs to perform a plurality of tasks and calculating a number of cases occurring by allocation of each of the tasks to the AGVs. The setting the moving path also includes calculating respective total costs required for the AGVs to perform a corresponding task or corresponding tasks for all of the cases, determining a smallest and largest value out of the respective total costs for each of the cases, and setting the moving path of the AGVs according to the case having the smallest value.

6 Claims, 8 Drawing Sheets

METHOD OF CONTROLLING AUTOMATIC GUIDED VEHICLE SYSTEM

CROSS-REFERENCE TO RELATED APPLICATION

This application claims the benefit of Korean Application No. 2002-38751, filed Jul. 4, 2002, in the Korean Intellectual Property Office, the disclosure of which is incorporated herein by reference.

BACKGROUND OF THE INVENTION

1. Field of the Invention

The present invention relates generally to a method of controlling an automatic guided vehicle system, and more particularly, to a method of controlling an automatic guided vehicle system having a plurality of automatic guided vehicles, which is capable of efficiently managing the automatic guided vehicles.

2. Description of the Related Art

In general, an Automatic Guided Vehicle system is used to automate loading and conveying of articles, and employs an Automatic Guided Vehicle (AGV). The AGV is an apparatus used to move loaded articles along a guideline located on the ground. A continuous guideline made of a magnetic tape is installed on a moving path of the AGV, and the AGV detects the guideline via a magnetic sensor, so that the AGV travels along the continuous guideline.

Figure 1A:
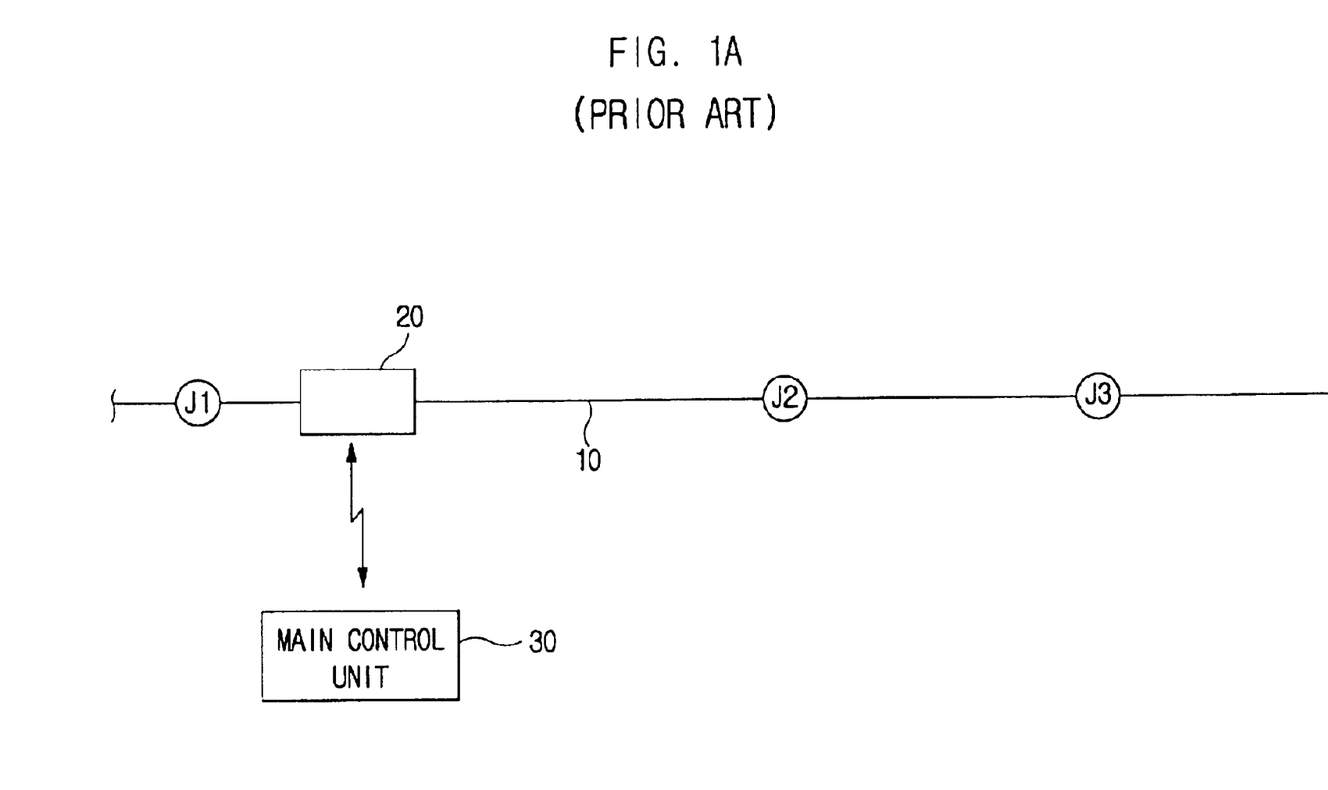
FIG. 1A is a schematic diagram illustrating an operation of a conventional AGV system.

FIG. 1A is a schematic diagram illustrating an operation of a conventional AGV system. Referring to FIG. 1A, in the conventional AGV system, a single AGV 20 carries out tasks J1, J2 and J3 on a moving path 10 along which the tasks J1, J2 and J3 exist. In this case, the AGV 20 receives task commands transmitted from a main control unit 30, and then performs the tasks while traveling along the moving path 10. The AGV 20 performs the tasks according to an order in which the task commands are received.

Figure 1B:
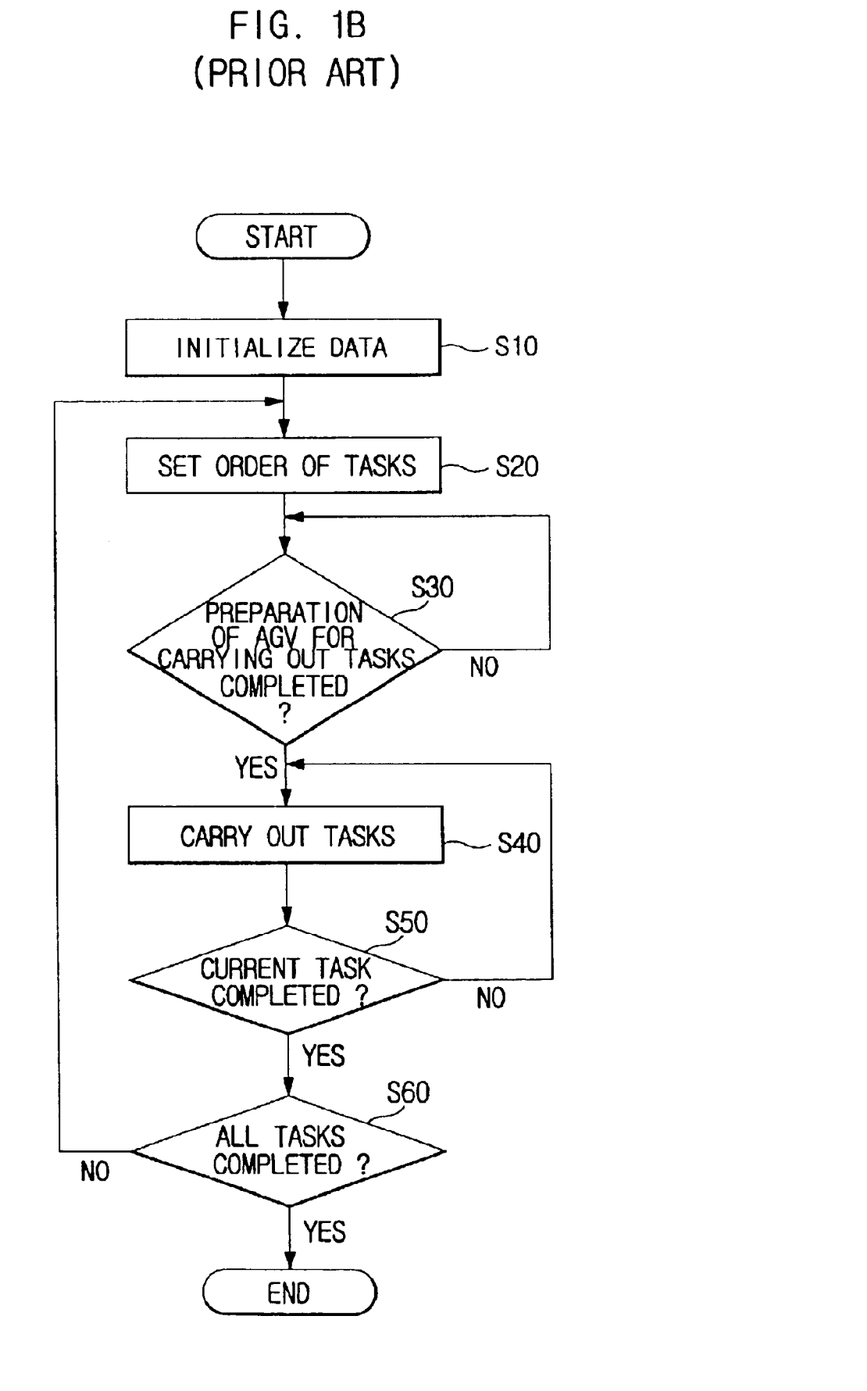
FIG. 1B is a flowchart illustrating a conventional method of controlling the conventional AGV system.

FIG. 1B is a flowchart illustrating an operation of the conventional AGV system. Referring to FIG. 1B, the AGV 20 initializes data at operation S10. If the initialization of the data is completed, the AGV 20 receives task commands from the main control unit 30 and sets the order of the tasks to be performed according to the task commands at operation S20. In this case, the AGV 20 sets the order of the tasks to correspond to the order of reception of the task commands transmitted from the main control unit 30 in accordance with a First-In First-Out (FIFO) rule. According to the FIFO rule, a task command which is input first is the task command which will be output and performed first by the AGV 20.

Thereafter, it is determined whether preparation of the AGV 20 to perform the tasks has been completed at operation S30. If the preparation of the AGV 20 to perform the tasks has been completed, the AGV 20 performs the tasks while traveling along the moving path 10 according to the order of tasks set at operation S20, at operation S40. Thus, the AGV 20 first performs a task corresponding to a first received task command based on the FIFO rule as described above. Thereafter, it is determined whether a current task has been completed at operation S50. As a result, if the current task has been completed, it is determined whether all the tasks corresponding to the received task commands has been completed at operation S60. If all the tasks have been completed, a process of the operation of the conventional AGV system is terminated.

As described above, the conventional AGV system has the single AGV and first performs the first received task command according to the FIFO rule. That is, in the case where the conventional AGV system is operated in the order of tasks (i.e., task J1, task J2 and task J3), the AGV 20 first performs the task J1, passes the task J2, moves to a location of the task J3 and secondly performs the task J3. Thereafter, the AGV 20 performs the task J2 after moving to a location of the task J2.

Accordingly, since the conventional AGV system uses a single AGV and first performs a first received task without taking a moving distance of the AGV into consideration, the moving distance of the AGV becomes unnecessarily long and consumes too much time to carry out tasks, thereby deteriorating efficiency of completing the tasks and productivity.

SUMMARY OF THE INVENTION

Accordingly, it is an aspect of the present invention to provide a method of controlling an AGV system having a plurality of automatic guided vehicles, which is capable of efficiently managing the AGVs.

Additional aspects and advantages of the invention will be set forth in part in the description which follows and, in part, will be obvious from the description, or may be learned by practice of the invention.

The foregoing and other aspects of the present invention are achieved by providing a method of controlling an AGV system. The AGV system has a plurality of AGVs and includes setting a moving path of the AGVs with task times of all the AGVs taken into account and controlling the AGVs according to the set moving path.

BRIEF DESCRIPTION OF THE DRAWINGS

The above and other aspects and advantages of the invention will become apparent and more appreciated from the following description of the preferred embodiments, taken in conjunction with the accompanying drawings of which.

DETAILED DESCRIPTION OF THE PREFERRED EMBODIMENTS

Reference will now be made in detail to the present preferred embodiments of the present invention, examples of which are illustrated in the accompanying drawings, wherein like reference numerals refer to like elements throughout.

Figure 2:
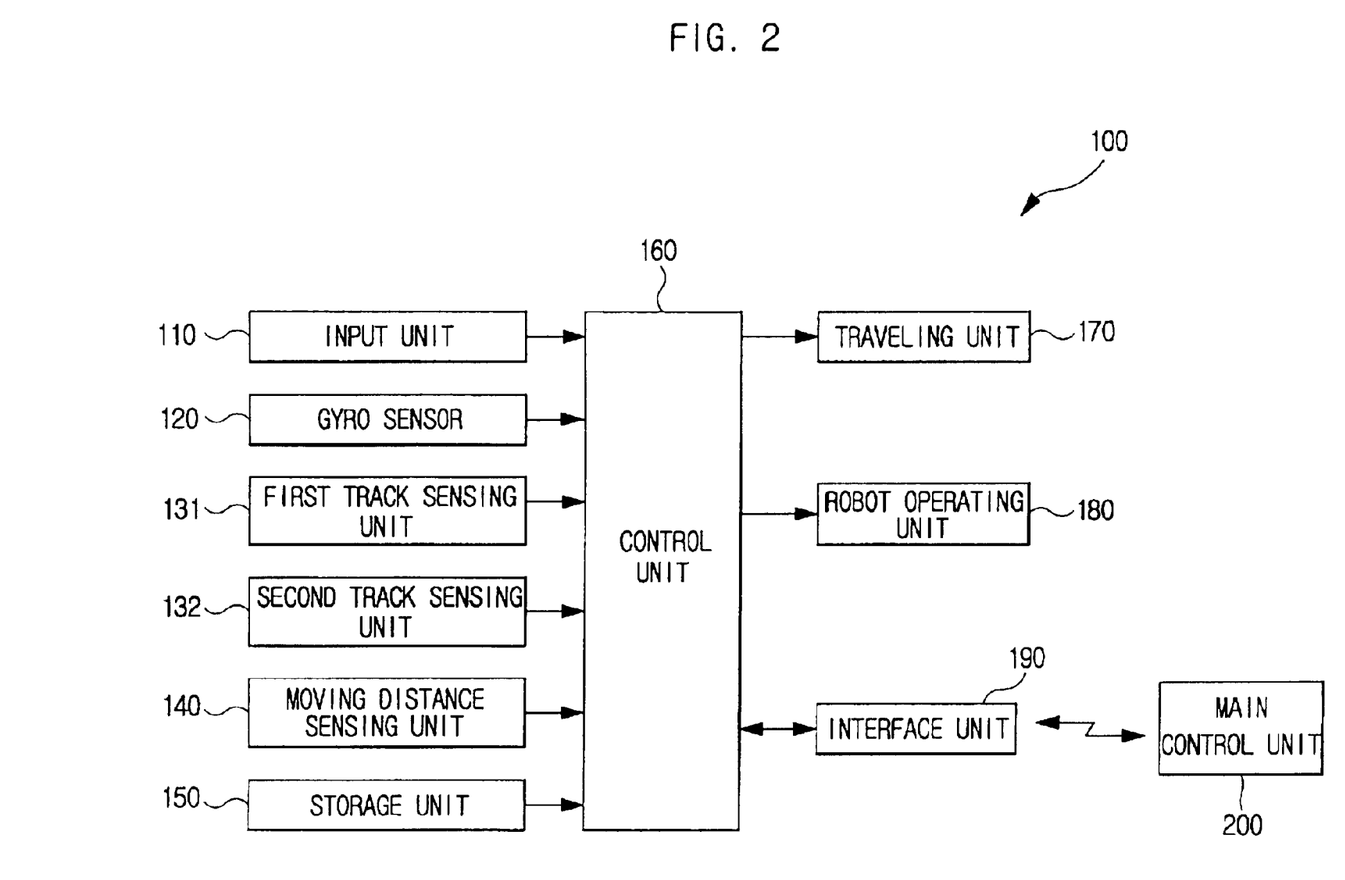
FIG. 2 is a block diagram illustrating a construction of an AGV, according to an embodiment of the present invention.

FIG. 2 is a block diagram illustrating a construction of an AGV, according to an embodiment of the present invention.

Referring to FIG. 2, an AGV 100 includes a control unit 160 to control an overall operation of the AGV 100 and an input unit 110 connected to the control unit 160 to set an operation of the AGV 100. The input unit 110 includes a hand-operated key input unit to directly enter information by hand.

Additionally, the AGV 100 includes a first track sensing unit 131 and a second track sensing unit 132 provided on a front end and rear end of the AGV 100, respectively, to detect guide tags installed on a moving path of the AGV 100. The AGV 100 also includes a moving distance sensing unit 140 to detect a moving distance of the AGV 100. The first and second track sensing units 131 and 132, and the moving distance sensing unit 140 are each electrically connected to the control unit 160. The AGV 100 includes a storage unit 150 which stores a control program, information inputted by the input unit 110 and data generated during the operation of the AGV 100, and is electrically connected to the control unit 160. The AGV 100 includes a traveling unit 170 to move the AGV 100 by operating a wheel (not shown) according to a control of the control unit 160, and a robot operating unit 180 to operate a robot according to the control of the control unit 160. Further, the AGV 100 includes an interface unit 190 connected to the control unit 160, to wirelessly access a main control unit 200.

The above-described first and second track sensing units 131 and 132 are used to detect the guide tags and are used as sensors to sense magnetic fields. Additionally, the moving distance sensing unit 140 may be used as encoders that are installed on wheels to allow the AGV 100 to travel. In this case, the control unit 160 calculates the moving distance of the AGV 100 by counting pulses outputted from the encoder.

Figure 3:
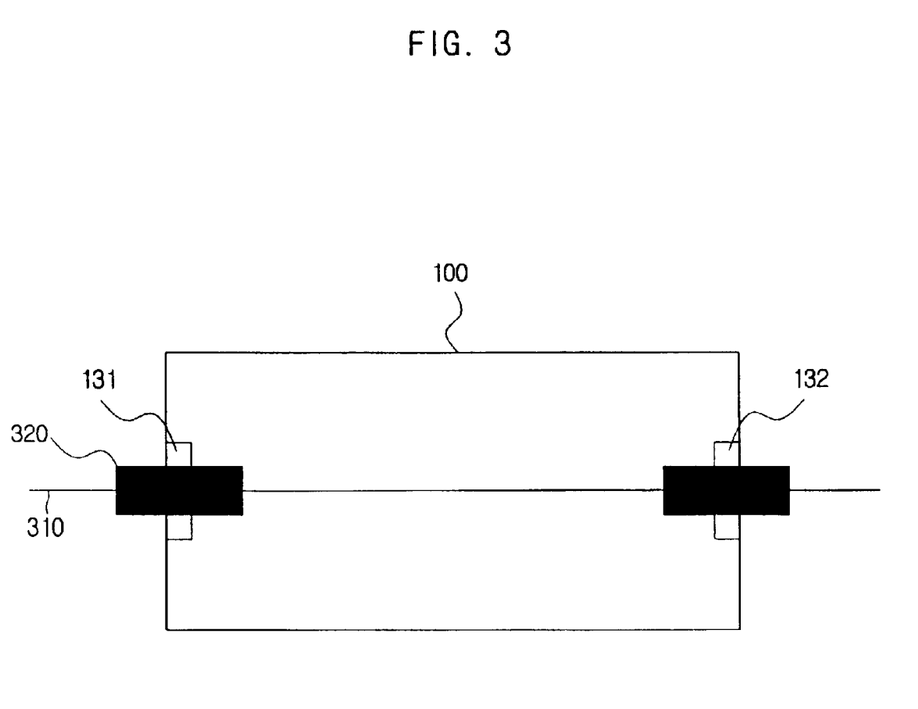
FIG. 3 is a diagram illustrating guide tags of the present invention.

FIG. 3 is a diagram illustrating the guide tags of the present invention. The guide tags 320 are magnetic tapes having a certain length and installed on the moving path 310 at certain intervals. As shown in FIG. 3, a pair of guide tags 320 are formed to be separated at the intervals. Each of the intervals is separated by a distance the same as a distance between the first and second track sensing units 131 and 132.

Figure 4:
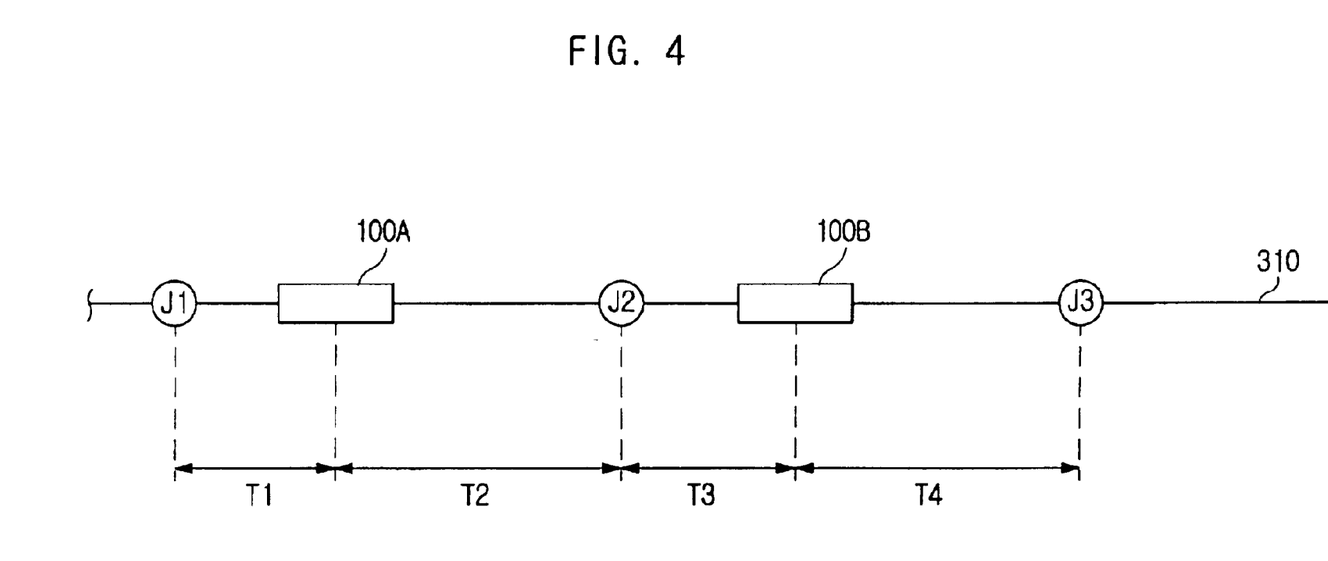
FIG. 4 is a schematic diagram illustrating a construction of the AGV system of the present invention.

FIG. 4 is a block diagram illustrating the construction of an AGV system of the present invention. Referring to FIG. 4, a plurality of tasks J1, J2, and J3 exist along the moving distance 310. A first AGV 100A and a second AGV 100B are provided to perform respective tasks of the tasks J1, J2 and J3. The first and second AGVs 100A and 100B have the same construction as the AGV 100 described in FIG. 2.

An operation of the AGV system of the present invention is described below.

Figure 5:
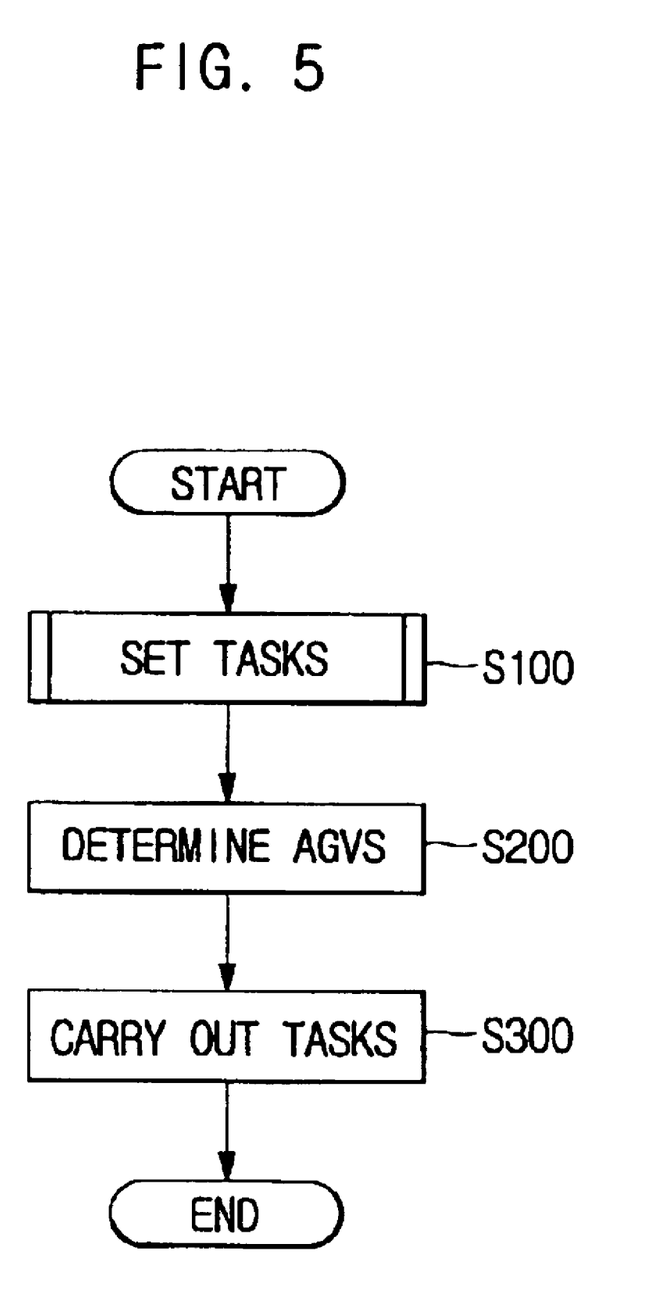
FIG. 5 is a flowchart illustrating a method of controlling the AGV system of the present invention.
Figure 6:
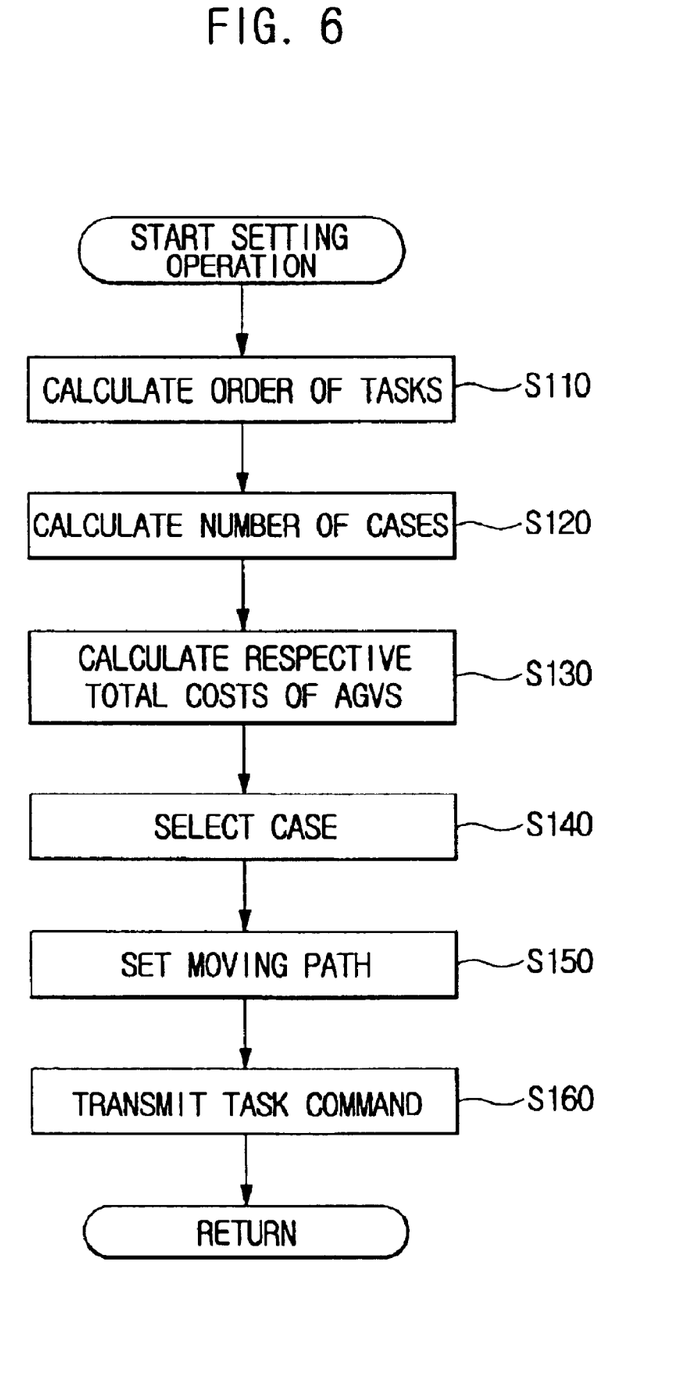
FIG. 6 is a flowchart illustrating the AGV system control method of the present invention in more detail.

FIGS. 5 and 6 are flowcharts illustrating a method of controlling the AGV system of the present invention. First, an operation of setting tasks is performed at operation S100. The operation of setting the tasks is shown in FIG. 6. As shown in FIG. 6, an order of tasks to be performed is calculated at operation S110. That is, the number of tasks on the moving path and the number of AGVs are used to calculate the order of tasks.) Thereafter, a number of cases is calculated according to the calculated order of the tasks at operation S120.

At operation S120, when n tasks, different from one another, are allocated to r (n>=r) AGVs, the number of cases is $_nP_r=n!/(n-r)!$. According to the embodiment of the present invention, when tasks J1, J2, and J3 exist and the number of AGVs is two, the number of cases is $_3P_2=3!/(3-2)!=6$. That is, when the number of cases is six, the cases are as follows:

1) case where tasks J1 and J2 are allocated to the first and second AGVs, respectively;

2) case where tasks J1 and J2 are allocated to the second and first AGVs, respectively;

3) case where tasks J1 and J3 are allocated to the first and second AGVs, respectively;

4) case where tasks J1 and J3 are allocated to the second and first AGVs, respectively;

5) case where tasks J3 and J2 are allocated to the first and second AGVs, respectively; and 6) case where tasks J3 and J2 are allocated to the second and first AGVs, respectively.

As indicated above, the task not allocated to the first or second AGV (the task J3) may be allocated to one of the first and second AGVs. The same may be applied to the rest of the above-described cases in the same manner Therefore, if in the embodiment of the present invention the tasks J1, J2 and J3 exist and the number of AGVs is two, the number of cases where the three tasks are allocated to the two AGVs is six.

Respective costs required to perform all of the current tasks are calculated for the six cases, which are shown in Table 1 below. In this case, the respective costs are in proportion to task times required to perform respective tasks. Table 1 shows respective costs C1 to C6 required for both first and second AGVs to perform all of the tasks J1, J2 and J3.

TABLE 1

|  | First AGV | Second AGV |
| --- | --- | --- |
| Task J1 | cost C1 | cost C4 |
| Task J2 | cost C2 | cost C5 |
| Task J3 | cost C3 | cost C6 |

If the calculation of the respective costs C1 to C6 required for both of the AGVs 100A and 100B to perform all of the tasks J1, J2 and J3 is completed, respective total costs required for both first and second AGVs 100A and 100B to perform a corresponding task or corresponding tasks are calculated for the six cases. That is, the total costs of the first AGV 100A and the total costs of the second AGV 100B are calculated for the six cases at operation S130.

The main control unit 200 determines the smallest and largest value out of the total cost of the first AGV 100A and the total cost of the second AGV 100B for each of the six cases. Thereafter, the case with the smallest value is selected at operation S140.

Then, the main control unit 200 sets the moving path 310 of the first and second AGVs 100A and 100B to perform tasks J1, J2 and J3 according to the selected case at operation S150. The main control unit 200 transmits a task command corresponding to the set moving path 310 to the first and second AGVs 100A and 100B at operation S160. Accordingly, the first and second AGVs 100A and 100B perform one or more of the tasks J1, J2 and J3 according to the task command transmitted from the main control unit 200 at operation S200 and then the tasks are performed at operation S300 (see FIG. 5).

Figure 7A:
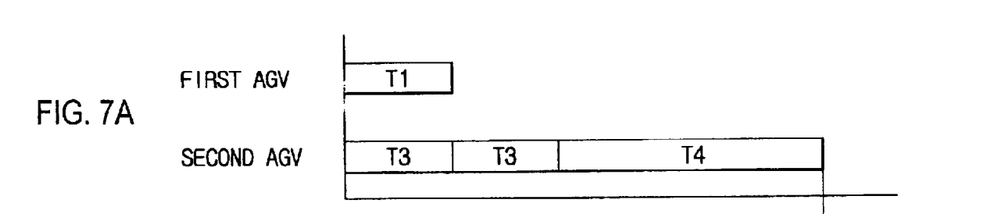
FIGS. 7A and 7B are diagrams illustrating a difference between a conventional AGV system control method and the AGV system control method of the preset invention.
Figure 7B:
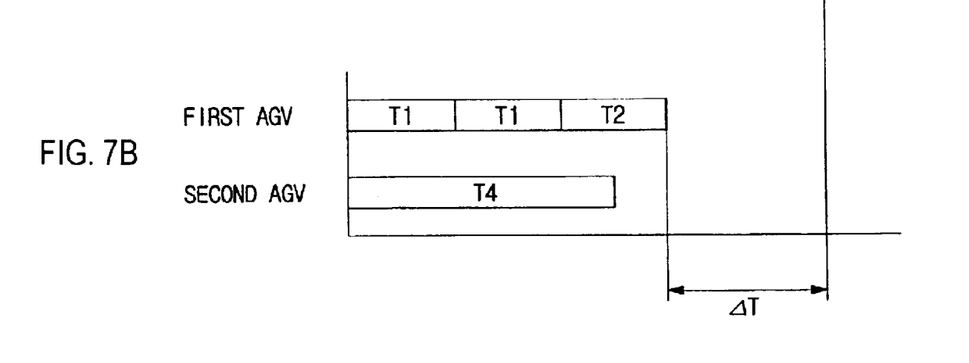

FIGS. 7A and 7B are diagrams illustrating the difference between a conventional AGV system control method and the AGV system control method of the present invention. Referring to FIGS. 7A and 7B, it will be appreciated that a total task time required for the first and second AGVs 100A and 100B to complete all of the tasks is decreased by ΔT in accordance with the AGV system control method of the present invention.

As described above, the AGV system control method of the present invention reduces the total task time required to complete the tasks by determining an optimum moving path while taking into consideration all tasks to be performed, thereby improving productivity.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of controlling an Automatic Guided Vehicle (AGV) system, the AGV system having a plurality of AGVs, comprising:
   setting a moving path of the AGVs with task performing times of all the AGVs taken into account; and
   controlling the AGVs according to the set moving path;
   wherein the setting the moving path comprises:
      calculating an order of a plurality of tasks to be performed;
      calculating respective costs required for the AGVs to perform all of the tasks;
      calculating a number of cases occurring by allocating the tasks to the AGVs;
      calculating respective total costs required for the AGVs to perform a corresponding task or corresponding task for each of the cases; and
      determining a smallest and largest value out of the respective total costs of the AGVs for each of the cases, and setting the moving path of the AGVs according to a case having the smallest value.

2. The method according to claim 1, wherein the respective costs are based on the task times required for the AGVs to perform the corresponding task or corresponding tasks.

3. An Automatic Guided Vehicle (AGV) system having a plurality of AGVs, comprising:
   a control unit to control an overall operation of an AGV; and
   an input unit connected to the control unit to set the operation of the AGV, wherein the AGV includes:
      a first track sensing unit and a second track sensing unit provided on a front end and rear end of the AGV to detect guide tags installed on a moving path of which the AGV travels;
      a moving distance sensing unit to detect a moving distance of the AGV;
      a storage unit to store a control program, information inputted by the input unit, and data generated during the operation of the AGV;
      a traveling unit to move the AGV by operating wheel located on the AGV according to control of the control unit; and
      a robot operating unit to operate a robot of the AGV according to control of the control unit.

4. The AGV system according to claim 3, wherein the moving distance sensing unit comprises an encoder installed on the wheels of the AGV to allow the AGV to travel, and the control unit calculates the moving distance of the AGV by counting pulses outputted from the encoder.

5. The AGV system according to claim 3, wherein the guide tags are magnetic tapes having a certain length and are installed on the moving path at certain intervals.

6. The AGV system according to claim 5, wherein the guide tags are separated by a distance the same as a distance separating the first and second track sensing units.

* * * * *